United States Patent [19]
Yi et al.

[11] Patent Number: 5,540,058
[45] Date of Patent: Jul. 30, 1996

[54] CONTAMINANT REMOVAL SYSTEM FOR PURIFYING AIR

[75] Inventors: Alex C. Yi, Cerritos; Scott R. Johnson, San Pedro, both of Calif.

[73] Assignee: Rockwell International Corp., Seal Beach, Calif.

[21] Appl. No.: 349,293

[22] Filed: Dec. 5, 1994

[51] Int. Cl.⁶ ........................................... F25J 3/00
[52] U.S. Cl. .................................................. 62/641
[58] Field of Search ......................................... 62/5, 18

[56] References Cited

U.S. PATENT DOCUMENTS

| | | |
|---|---|---|
| 1,717,540 | 6/1929 | Aubert . |
| 2,413,752 | 1/1947 | Dennis ................ 62/175.5 |
| 3,103,427 | 9/1963 | Jennings .................. 62/39 |
| 3,144,317 | 8/1964 | Arnoldi .................. 62/12 |
| 3,286,954 | 11/1966 | Swet ..................... 244/1 |
| 3,899,684 | 8/1975 | Tenney ..................... 62/5 |
| 4,185,977 | 1/1980 | Shirokov et al. ............ 62/5 |
| 4,283,916 | 8/1981 | Bassotti ................... 62/5 |
| 4,337,971 | 6/1982 | Yang ...................... 62/37 |
| 4,407,134 | 10/1983 | Snaper .................... 62/5 |
| 4,584,838 | 4/1986 | Abujudom, II ............. 62/5 |
| 4,718,251 | 1/1988 | Thornton ................ 62/475 |

*Primary Examiner*—Ronald C. Capossela
*Attorney, Agent, or Firm*—Lawrence N. Ginsberg; Charles T. Silberberg

[57] ABSTRACT

The invention is a contaminant removal system for purifying air. Incoming air is cooled to a cryogenic temperature. A vortex tube further cools the cooled air so as to solidify contaminants therein. A filter system then filters out the solidified contaminants from the air.

Use of a vortex tube minimizes the amount of moving parts. This reduces maintenance and concommitant costs involved with operation. The present system has a long life. The vortex tube is relatively inexpensive.

9 Claims, 1 Drawing Sheet

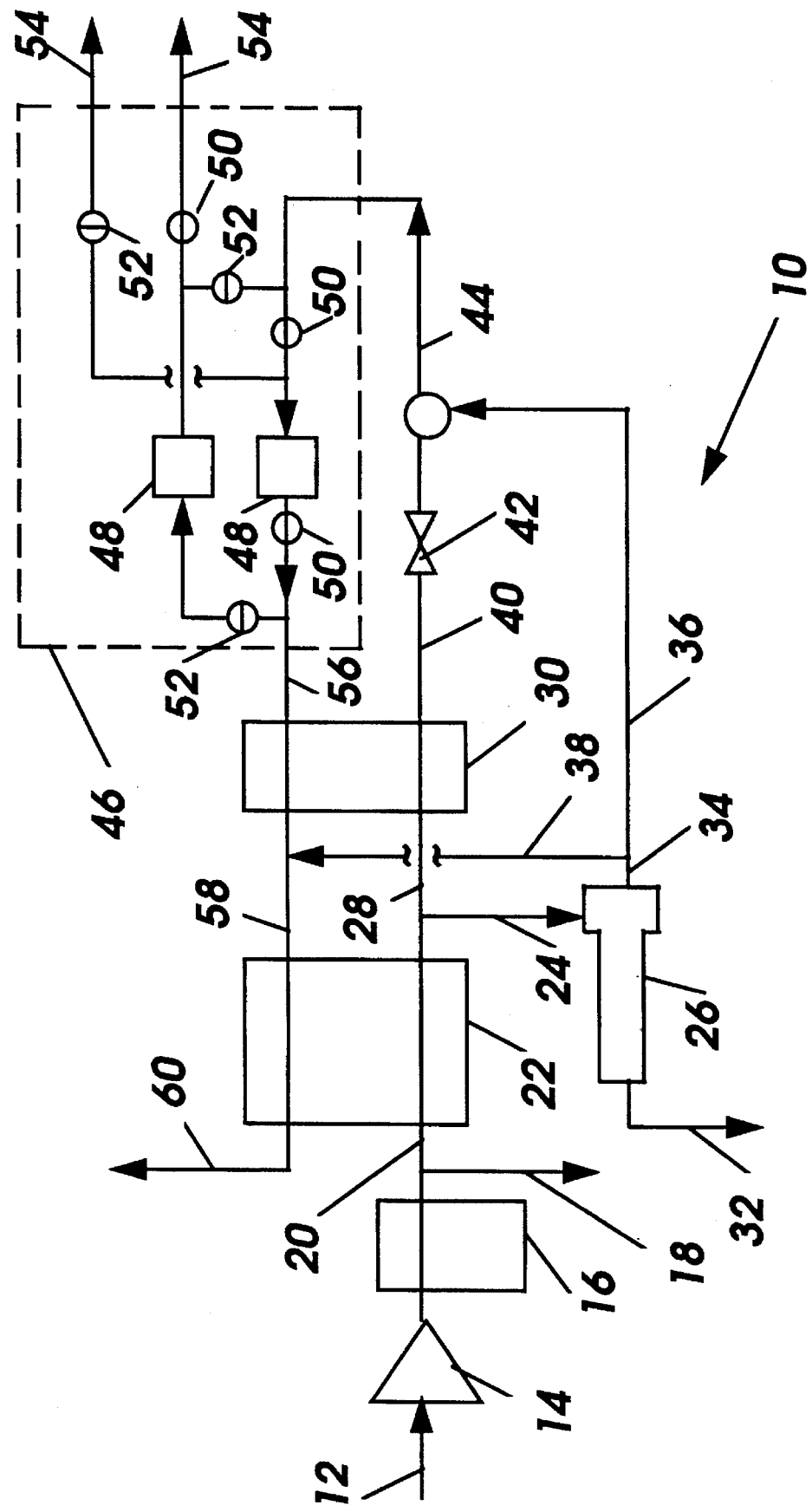

CONTAMINANT REMOVAL SYSTEM FOR PURIFYING AIR

BACKGROUND OF THE INVENTION

1. Field of the Invention

The present invention relates to the purification of air and, more particularly, to a cryogenic system, which uses a vortex separator for solidifying contaminants and, therefore, provides an effective means for purifying the air.

2. Description of the Related Art

Air pollution in the urban and industrial areas is a severe problem, due to the exhaust products of the factories and automobiles. Fundamental solutions generally involve formidable expenditures and long term technological development. There is a need for on-site, low cost systems that can purify the air for use in automobiles, homes, offices, hospitals, etc. The current state-of-the-art method for air purification is effected by using filters containing substances such as activated charcoal and a variety of chemicals. The shortcomings of such devices are two-fold: First, they can only remove a limited number of pollutants, and secondly, the process is irreversible, therefore, periodic replacement of the devices is necessary, which contributes to the high cost of this type of system.

Several cryogenic techniques have been proposed in attempts to achieve cost effectiveness. Examples include U.S. Pat. No. 4,718,251, entitled "De-Contaminated Fluid Supply Apparatus and Cryogenic Cooling Systems Using Such Apparatus"; U.S. Pat. No. 3,286,954, entitled "Method and Apparatus for Supporting Life in Outer Space"; U.S. Pat. No. 3,144,317, entitled "Freezing Process for Removal of Carbon Dioxide From Air"; U.S. Pat. No. 3,103,427, entitled "Carbon Dioxide Freezeout System"; U.S. Pat. No. 2,413,752, entitled "Separation of the Constituents of Gaseous Mixtures"; and, U.S. Pat. No. 1,717,540, entitled "Process for Preventing Explosions in Liquid-Air Apparatus".

U.S. Pat. No. 4,337,071, issued to L. C. Yang, entitled "Air Purification System Using Cryogenic Techniques" discloses the use of a closed-cycle operated cryogenic refrigerator for cooling air to a cryogenic temperature and, therefore, solidifying contaminants. A filter system can then filter out the solidified contaminants from the air. The refrigeration proposed by L. C. Yang consists of a compressor, a Joule-Thompson valve, multi-stage heat exchangers and expanders. The disadvantage of the use of such expanders is that they must operate at very high speeds with resultant mechanical wearout. Such expanders are quite expensive.

OBJECTS AND SUMMARY OF THE INVENTION

It is, therefore, a principal object of the present invention to provide an efficient, low-cost technique for purifying air with a minimal amount of moving parts.

This, and other objects, are achieved by the present invention, which is a contaminant removal system for purifying air. Incoming air is cooled to a cryogenic temperature. A vortex tube further cools the cooled air so as to solidify contaminants therein. A filter system then filters out the solidified contaminants from the air.

Use of a vortex tube minimizes the amount of moving parts. This reduces maintenance and concomitant costs involved with operation. The present system has a long life. The vortex tube is relatively inexpensive.

Other objects, advantages and novel features of the present invention will become apparent from the following detailed description of the invention when considered in conjunction with the accompanying drawings.

BRIEF DESCRIPTION OF THE DRAWINGS

The sole FIGURE is a schematic block diagram of the contaminant removal system of the present invention.

DETAILED DESCRIPTION OF THE INVENTION

Referring to the drawings and the characters of reference marked thereon, the sole FIGURE illustrates a preferred embodiment of the contaminant removal system of the present invention, designated generally as 10.

Incoming air 12 is introduced to a compressor 14 for providing pressurized air. The compressor 14 may be a centrifugal-type compressor, vane-type compressor or other suitable compressor, such as a piston-type. The pressurized air is then introduced into a radiator 16, which cools the air to close to ambient temperature. Water is removed, as shown by numeral designation 18. Such water removal may be accomplished by conventional means, such as a molecular sieve or water-absorbing chemicals, such as calcium chloride. The dry air 20 is directed through a primary heat exchanger 22. A first desired portion 24 from primary heat exchanger 22 is directed to the vortex tube 26. A second desired portion 28 is directed through a secondary heat exchanger 30. Such a split flow is provided to cool the contaminant-free air, as will be described below.

Separation of hot gases and cold gases by vortex separation methods is known. A single phase (gas) and single component vortex tube is known as the Ranqe-Hilsch tube. In the tube, compressed gas is introduced through a nozzle, which is directed tangential to the tube. The gas generates a vortex as it travels to the center of the tube and propagates through the tube. As the gas travels into the center of the vortex, the velocity of the gas increases due to the pressure gradient. The velocity is eventually reduced as the gas travels further into the tube's center, because the viscosity of the gas slows the fluid. When the gas flows down to the center of the vortex, the gas has to surrender its kinetic energy. Kinetic energy in the vortex tube is released by transferring the energy from the inner to outer vortex. Thus, the energy separation occurs between the inner and outer vortex causing the temperature differential between the cold inner and hot outer vortex. The result of such an energy separation is that the hot gas 32 is directed in a first direction, and cold gas 34 is directed in an opposite second direction as shown in the FIGURE. The hot air 32 is removed from the system. The cold side output 34 of the vortex tube 26 is split into a major portion 36 and a minor portion 38. The cold side output 34 of the vortex tube 26 contained solidified contaminants. The major portion 36 is combined with the output 40 from the secondary heat exchanger 30 after expansion via expansion valve 42.

The combined flow 44 is gaseous air containing solidified contaminants. Combined flow 44 is introduced to a filter system, designated generally as 46.

Filter system 46 preferably comprises a pair of regenerative filters 48, which may be alternately regenerated and operated. Thus, when valves 50 are open, valves 52 are closed, and vice versa. Regenerative filters 48 may comprise, for example, aluminum, wool, steelwool or fiberglass fabric. Such regenerative filters are commercially available.

The solid contaminants are collected and extracted from the system 10, as shown by numeral designations 54.

The filtered contaminant-free air 56 from the filter system 46 is introduced through a counterflow side of the secondary heat exchanger 30. The output is combined with the minor portion 38 of the output 34 from the vortex tube 26. This combined flow 58 is directed through the counterflow side of the primary heat exchanger. This serves to cool the incoming air 20. The final contaminant-free air product 60 is available for its desired usage.

The compressor output is generally in a range of about 60 psia to 120 psia, preferably about 100 psia. The cold side output 34 of the vortex tube 26 is approximately in a range of −200° F. to about −280° F.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A contaminant removal system for purifying air comprising:
   a) a compressor for pressurizing incoming air to a cryogenic temperature;
   b) a radiator for cooling the pressurized air supplied by said compressor;
   c) a primary heat exchanger for further cooling the pressurized air supplied by said radiator;
   d) a vortex tube for further cooling the cooled air supplied by said primary heat exchanger so as to solidify contaminants therein; and,
   e) a filter system for filtering out said solidified contaminants from said air.

2. The contaminant removal system of claim 1, wherein the output flow of air from said primary heat exchanger is split, a first desired portion being directed to said vortex tube, and a second desired portion being directed through a secondary heat exchanger.

3. The contaminant removal system of claim 2, wherein said portion is expanded by means of an expansion valve downstream of said secondary heat exchanger.

4. The contaminant removal system of claim 3, wherein the output from said secondary heat exchanger is combined with a cold side output of said vortex tube, the combined flow being introduced to said filter system.

5. The contaminant removal system of claim 1, wherein said filter system comprises a pair of regenerative filters, which may be alternately regenerated and operated.

6. The contaminant removal system of claim 4, wherein said filter system comprises a pair of regenerative filters, which may be alternately regenerated and operated.

7. The contaminant removal system of claim 6, wherein an output of filtered contaminant-free air from said filter system is introduced through a counterflow side of said secondary heat exchanger.

8. The contaminant removal system of claim 7, wherein said cold side output of said vortex tube is split into a major portion and a minor portion, prior to being combined with said output from said secondary heat exchanger, said major portion being so combined with said output from said secondary heat exchanger, said minor portion being combined with flow from the counterflow side of said secondary heat exchanger.

9. The contaminant removal system of claim 8, wherein the combination flow comprising said minor portion and flow from said counterflow side is introduced to a counterflow side of said primary heat exchanger, the output therefrom being the final contaminant-free air product.

\* \* \* \* \*